United States Patent [19]

Warga

[11] Patent Number: 5,004,368

[45] Date of Patent: Apr. 2, 1991

[54] PIVOT ARM FOR APPARATUS, PARTICULARLY MEDICAL APPARATUS

[76] Inventor: Ewald Warga, Hegel-Str. 6, D-7130 Mühlacker 3, Fed. Rep. of Germany

[21] Appl. No.: 324,005

[22] Filed: Mar. 16, 1989

[30] Foreign Application Priority Data

Mar. 19, 1988 [DE] Fed. Rep. of Germany ....... 3809266

[51] Int. Cl.⁵ ............................................. F16B 7/10
[52] U.S. Cl. .................................. 403/166; 403/145; 248/280.1; 248/281.1
[58] Field of Search ............... 403/166, 161, 145, 149, 403/134, 157; 248/280.1, 281.1; 74/531, 96

[56] References Cited

U.S. PATENT DOCUMENTS

| 4,082,244 | 4/1978 | Groff | 248/280.1 |
| 4,111,576 | 9/1978 | Jordan | 403/134 |
| 4,144,831 | 3/1979 | Heydolph | 403/166 X |
| 4,160,536 | 7/1979 | Krogsrud | 248/280.1 |
| 4,199,179 | 4/1980 | Curry | 403/166 X |
| 4,397,439 | 8/1983 | Wilbur et al. | 248/280.1 X |
| 4,456,233 | 6/1984 | Müller | 403/166 X |
| 4,512,600 | 4/1985 | King | 403/166 X |
| 4,584,898 | 4/1986 | Panushka | 403/166 X |
| 4,591,122 | 5/1986 | Kreuzer | 248/281.1 X |
| 4,657,217 | 4/1987 | Kiesel et al. | 248/280.1 |

FOREIGN PATENT DOCUMENTS

| 1466999 | 4/1969 | Fed. Rep. of Germany . |
| 2311257 | 9/1974 | Fed. Rep. of Germany . |
| 2659444 | 1/1978 | Fed. Rep. of Germany . |
| 8436137 | 6/1986 | Fed. Rep. of Germany . |
| 8704632 | 6/1987 | Fed. Rep. of Germany . |
| 3703424 | 10/1987 | Fed. Rep. of Germany . |
| 1422927 | 10/1964 | France . |

Primary Examiner—Peter M. Cuomo
Attorney, Agent, or Firm—Wigman & Cohen

[57] ABSTRACT

A pivot arm for apparatus, particularly medical apparatus has two mounting supports and a connecting cross-member. One mounting support is to be mounted on a stationary support and the other is to be attached to the apparatus to be moved. A first coupling hingedly connects one of the mounting supports to a connecting rod housed within the cross-member, and the other end of the connecting rod is connected to the other mounting support. A helical spring is supported concentrically with respect to the connecting rod within the cross-member. The cross-member is formed as a single hollow, essentially completely closed, primarily tubular spring housing and a second coupling is provided between a spring support that is near the end of the rod and is stationary relative thereto, and the adjacent mounting support, so that both couplings are always arranged parallel to each other in the housing. The ends of the housing are sealed with caps to prevent the escape of undesirable matter, such as dust, dirt, or lubricants.

21 Claims, 5 Drawing Sheets

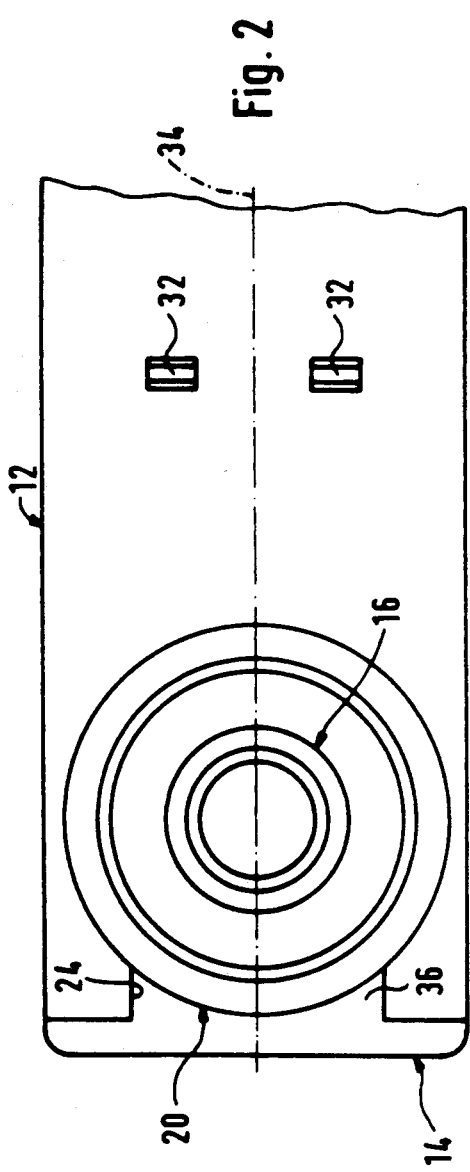
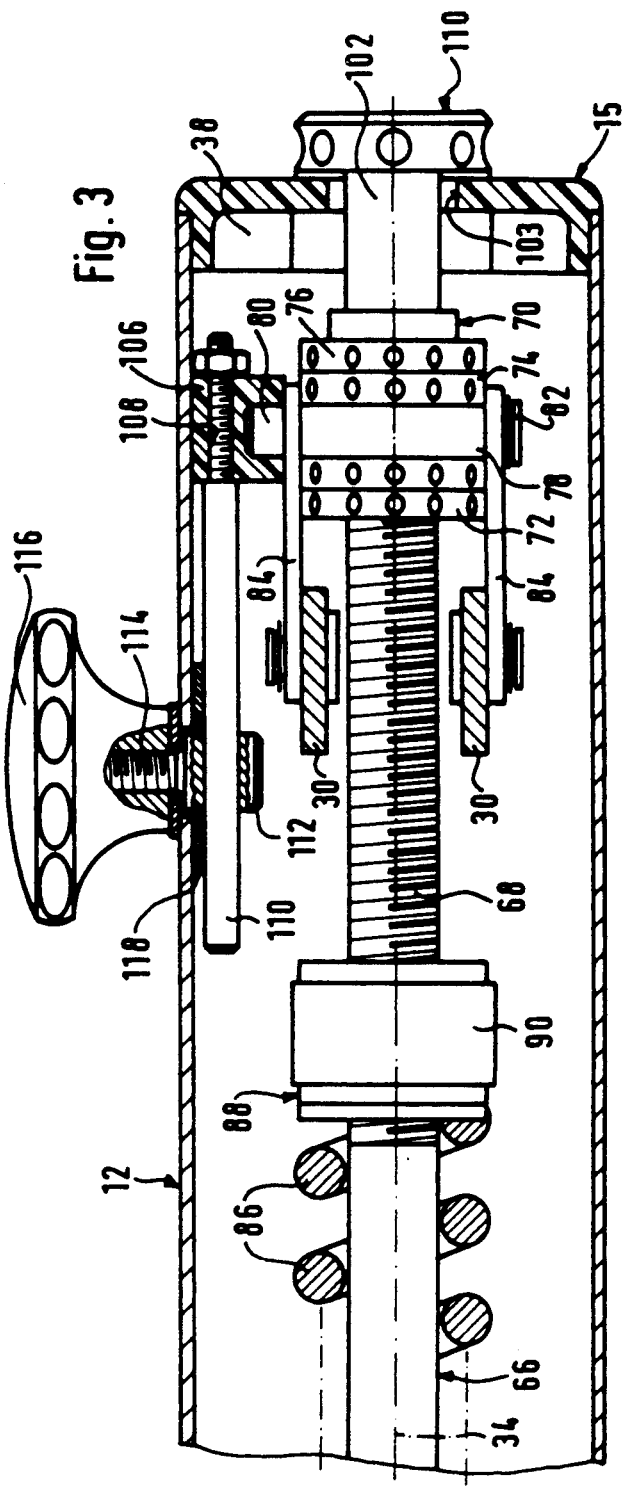

PIVOT ARM FOR APPARATUS, PARTICULARLY MEDICAL APPARATUS

BACKGROUND OF THE INVENTION

1. Field of the Invention

The present invention relates to a pivot arm, one end of which is to be mounted on a stationary support or other such carrier, or is to be attached to an apparatus, specifically a medical apparatus, that can be moved up and down and pivoted in a plane; having two mounting bolts or supports that are always parallel and are connected with each other by at least one cross-member that is hinged to both bolts or supports by parallel pivot axles; having a spring housing in which a helical compression spring that is supported indirectly on the spring housing and a connecting rod that holds a spring support stationary relative to the bar are arranged, and which spring housing is hinged to at least one of the two mounting bolts or supports by means of at least one coupling.

2. Description of the Prior Art

In a known pivot or shear arm of this type, two constantly parallel cross-members are provided to form a variable parallelogram with the two mounting supports. The separate spring housing is arranged on one of the two constantly parallel cross-members between the two such cross-members, whereby a single coupling provides the articulated connection to the mounting support to mount one end of the pivot arm on a stationary support. The two cross-members can laterally overlap one another, at least when arranged horizontally; but this does not assure that dust, lubricant or particles produced by wear that are present in the cross-members or the spring housing cannot pass through the hinge points of the cross-members and the coupling and, for example, endanger a medical operation being performed by means of an apparatus arranged on the coupling-remote mounting support of the pivot arm for this apparatus.

SUMMARY AND OBJECTS OF THE INVENTION

In view of the foregoing limitations and shortcomings of the prior art devices, as well as other disadvantages not specifically mentioned above, it is, therefore a primary objective of the invention to create a pivot arm for apparatus, particularly medical apparatus, the inside of which remains free of dust and cannot produce lubricant or wear particles from the hinge points.

Briefly described, this object is achieved according to the invention with a pivot arm of the above-described type, by means of a single, hollow, primarily tubular cross-member essentially closed on all sides as the spring housing and by means of a second coupling between the end of the bar nearest the spring supports and the adjacent mounting bolts or supports, whereby both couplings are arranged in cross-member spring housing so as to always be parallel.

By this means it is advantageously achieved that all parts of the pivot arm, particularly its movable parts, are encapsulated, except, of course for the mounting bolts or supports that project out of the cross-member spring housing, which nevertheless are simply sealed against the spring housing, so that lubricant or wear particles cannot fall out. This would also be true for dust, if any were able to penetrate through the encapsulation into the pivot arm. A particular advantage of the pivot arm according to the invention is that, in case it is to be used in the practice of medicine, with a complete encapsulation it is sealed againts liquids and can therefore be sterilized before being used medically.

A preferred embodiment of the pivot arm according to the invention is, like the known pivot arm, provided with a device for adjusting the bias of the spring supported against a tensioning element that is stationary relative to the housing, so that the weight of the apparatus arranged on the pivot arm can be approximately compensated. In the known pivot arm the tension adjusting device has, as the tensioning element that is stationary relative to the spring housing, a loose annular disc sitting on the solid connecting rod, and as a spring support stationary on the rod, an adjusting nut threaded on the threaded end section of the connecting rod. The tension adjusting device in the pivot arm according to the invention is characterized by the fact that the tensioning element in the cross-member spring housing can be moved back and forth in its longitudinal direction and can be moved relative to the housing by means of a second connecting rod (bar) in the hollow first connecting rod (tube), for which purpose the radially inner connecting rod carries a tie bolt on its axially inner end, which engages on the tensioning element, perhaps by means of the racially outer connecting rod, and has a threaded section on its axially outer end that is provided with an axially fixed adjusting screw element which is arranged to rotate outside the cross-member spring housing and can be rotated, for example, by means of a special wrench. This tension adjusting device makes possible the complete encapsulation of the pivot arm according to the invention.

In its preferred embodiment, as in the known pivot arm, where the cross-member(s) and the spring housing have a rectangular profile, it is provided that the single cross-member has an annular profile with four right angles and at each of its two ends it has a long opening that is open at the end for the passage of a mounting bolt or support; and the two pivot axles for the two bolts or supports are mounted to this housing outside the cross-member spring housing by means of the flat section flanking the long openings. The rectangular profile of the cross-member spring housing makes it possible to smoothly guide movable parts and its long openings and the mounting of the pivotable mounting bolts or supports permits a premounting thereof to the couplings that are connected with each other by the first connecting rod (tube), so that the premounted, articulated structure, in its extended form, can be pushed into the cross-member spring housing and can be brought into a useful form, which is established by means of the two pivot axles of the mounting bolts or supports, by subsequently bending the mounting bolts or supports.

In the preferred embodiment the two ends of the cross-member spring housing are closed by means of respective insertable caps and the two housing openings for the two mounting bolts or supports are closed so as to be liquid-proof by means of respective folding bellows that are clamped in place and do not engage behind the housing. This effective encapsulation is particularly simple and makes it possible to perform the above-described premounting process.

In the preferred embodiment, each folding bellows closes two of the flat sections to mount the pivotable mounting bolts or supports; in addition, one end thereof is located on a holding ring on the underside of the housing surrounding the associated long opening in the cross-member spring housing, and at the other end it is located on the associated mounting bolts of supports in a form fitting and/or force fitting manner. This embodiment of the encapsulation makes possible a simple connection of the two bellows.

The preferred embodiment, like the known pivot arm, is provided with a device for braking or arresting the cross-member(s), which has a bar that is hingedly connected with a mounting bolt or support and a through-bored apparatus element that guides the bar in its longitudinal direction, which element is attached to an axially movable threaded bar, which bar is mounted in a non-rotatable manner on this cross-member and is threaded with an axially immovable rotatable knob with internal threading that is rotatably mounted on each cross-member. While one end of the bar of the braking or arresting device of the known pivot arm, like the two cross-members, is hinged to a lateral projection on the coupling-remote mounting support, the braking or arresting device of the pivot arm according to the invention is characterized in that the bar is connected to a hinge axle to connect one of the two couplings with the hollow first connecting rod, so that it is always pushed parallel to this tube and to the coaxial cross-member spring housing.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 2 is a partial bottom view of the end portion of the pivot arm illustrated in FIG. 1a, as viewed from below;

FIG. 3 is a partial view of the elements illustrated in FIG. 1b, with the lower external elements of the housing and the bottom of the housing removed for purposes of illustration, as viewed from below;

DETAILED DESCRIPTION OF A PREFERRED EMBODIMENT

Figure 1A:
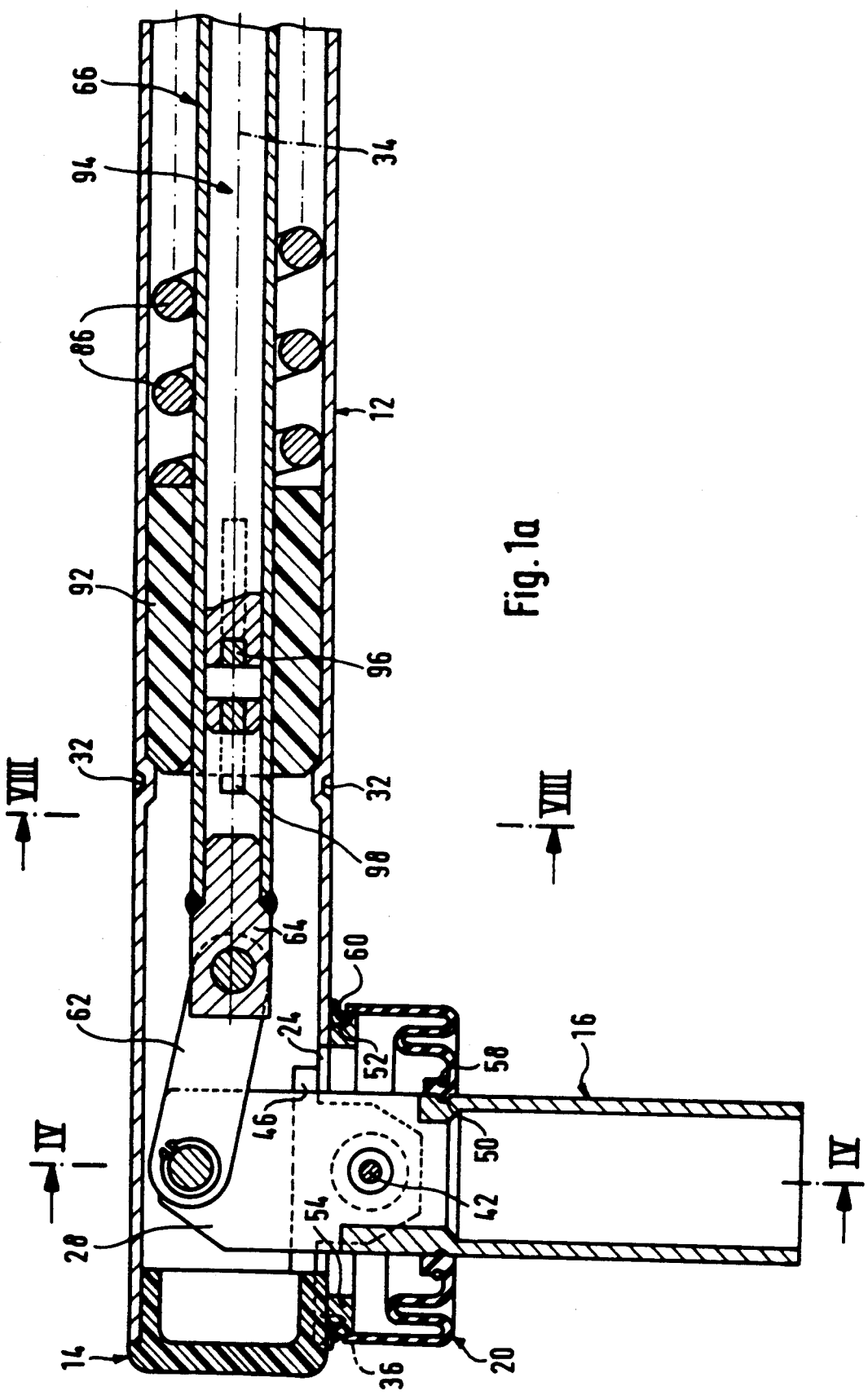
FIGS. 1a and b are cross-sectional views, taken along a central longitudinal plane, of the two end portions of a pivot arm in accordance with the invention, with a central interruption between the two illustrated end portions.
Figure 1B:
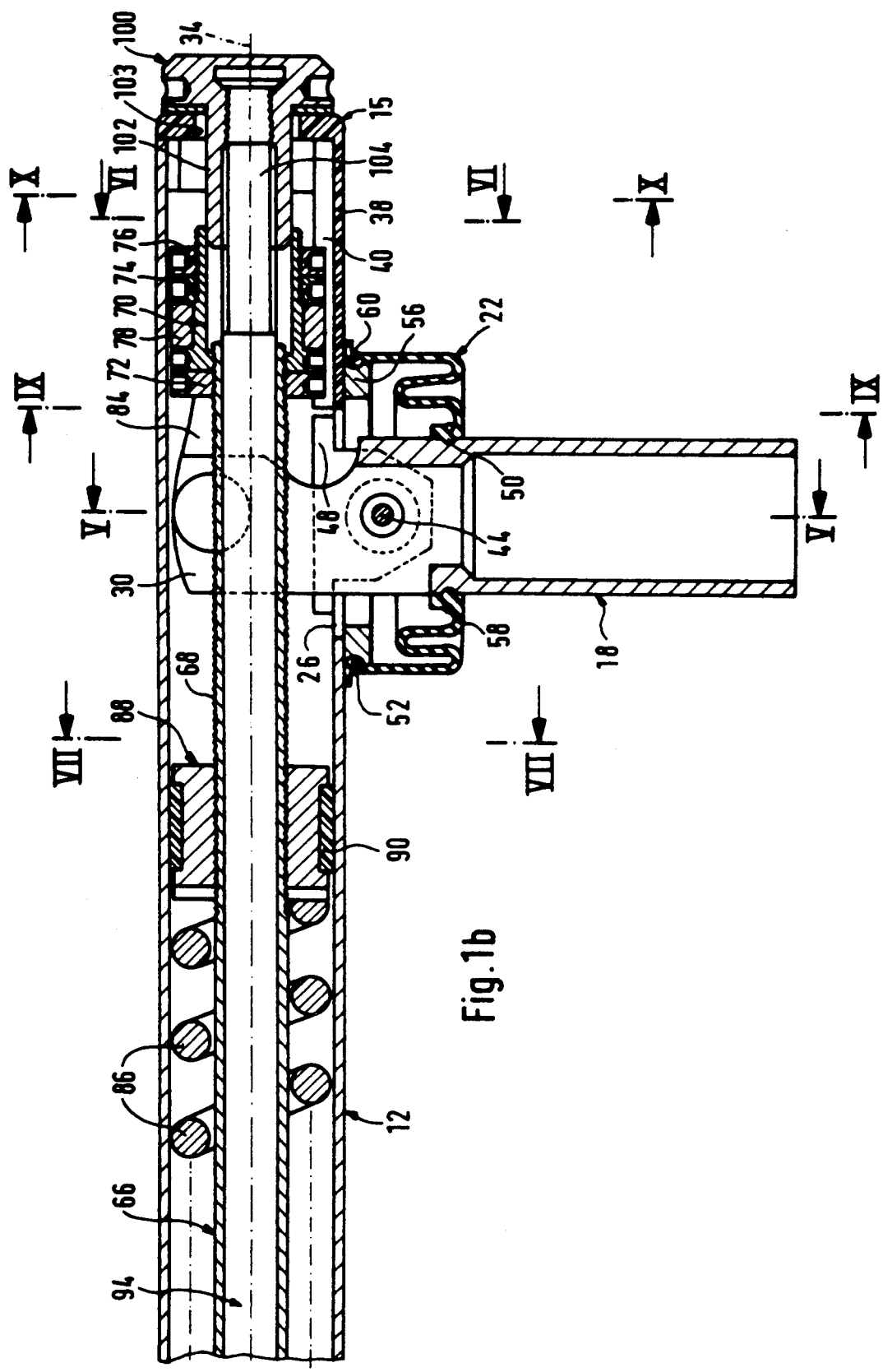
Figures 4, 5:
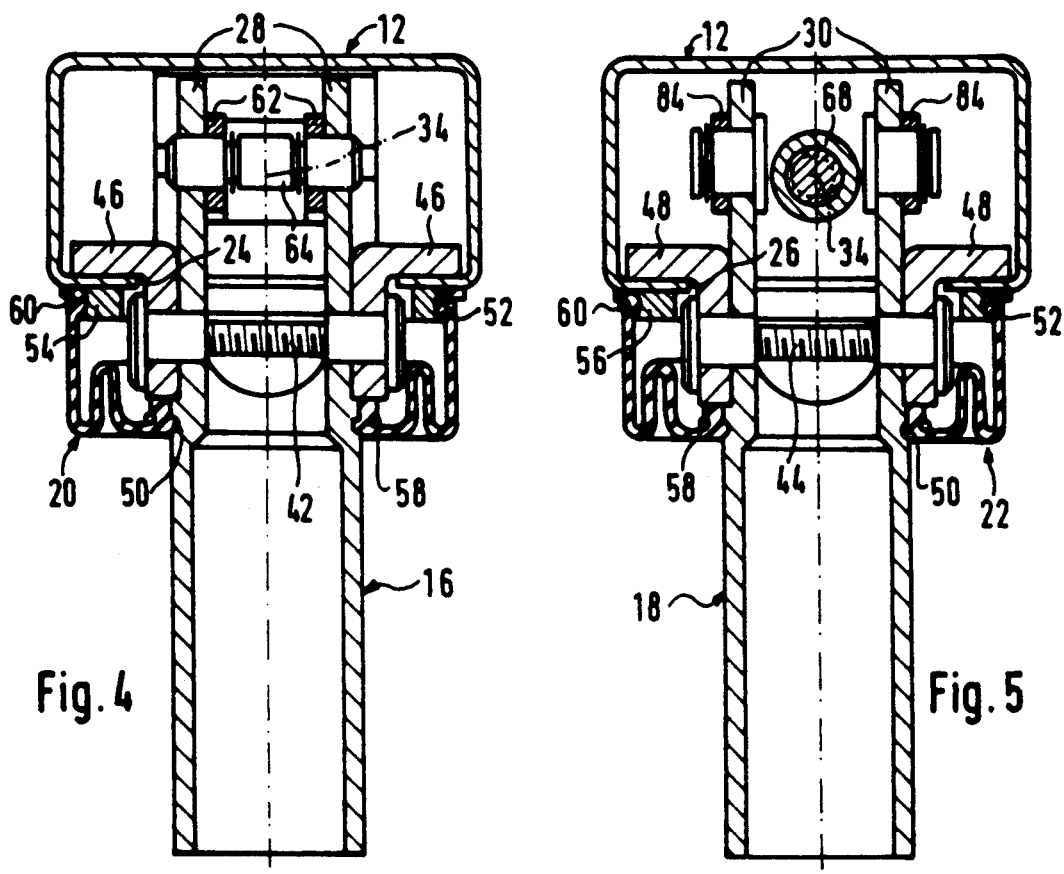
FIGS. 4 and 5 are respective vertical cross-sections according to the line IV—IV in FIG. 1a or V—V in FIG. 1b through the exemplary embodiment as viewed in opposing horizontal directions.

Referring now in detail to the drawings wherein like parts are designated by like reference numerals throughout, there is illustrated in FIGS. 1a and 1b, a pivot arm according to the invention. In the exemplary embodiment, the pivot arm according to the invention primarily externally comprises a flat, four-sided tube 12, made for example of aluminum; two caps 14 and 15 that close the open ends of the tube 12, which caps are preferably made of plastic; two always-parallel cylindrical mounting supports 16 and 18, made for example of aluminum, on the tube ends, and of two annular folding bellows 20 and 22, made for example of rubber, on the tube ends, each of which surrounds the upper end of a vertical mounting support 16, 18 so as to seal it against liquid, and is attached to the underside of the tube 12. It should be assumed that the one support 16 serves to provide the end mounting of the pivot arm to a stationary support or other such carrier and the other support 18 serves to attach an apparatus to the other end of the pivot arm that pivots up and down in a plane.

The four-sided tube 12 has at the bottom on each end a rectangular longitudinal opening that is open toward the end 24, 26 which openings are of different lengths for the passage of an upward extension 28, 30 of the support 16, 18, which support thereby engages into the hollow chamber in the tube 12. Near the mounting support 16, the top and bottom sides of the tube 12 are provided with respective pairs of inwardly projecting beads 32, which are arranged in the same cross-sectional plane of the tube 12, which is perpendicularly intersected by the central longitudinal axis 34 of the tube 12. Otherwise the four-sided tube 12 is completely smooth.

The inserted cup-shaped cap 14 closes flush with the end of the tube it closes and a thicker area 36 engages below in the end section of the longitudinal opening 24. The inserted cup-shaped cap 15 closes flush with the end of the tube 12 it closes and closes the end section of the longer longitudinal recess 26 by means of a large-surface-area downward projection 38, which projection is formed thereon and on an extension 40 present only on the bottom.

The two mounting supports 16 and 18 that are connected with each other by the four-sided tube 12 as a cross-member are provided on their upper ends, inside and outside the tube, with the extensions 28, 30, which here are two parallel plates, on which a pivot axle 42, 44 is rotatably mounted, which is supported on two essentially L-shaped flat elements 46, 48 that are arranged as mirror images of each other, the horizontal leg of which lies on the edges of the longitudinal recess 24 or 26 and the projecting, axle-carrying, vertical leg flanks the parallel edges of this recess.

The similar folding bellows 20 and 22 do not engage behind anything, but are profiled primarily in an S-shape and are arranged radially inward against the mounting support 16, 18 and axially upward on the under side of the four-sided tube 12 by force and form fit, by means of the fact that an annular band 50 engages in a corresponding annular groove in the mounting support or an annular bead 52 engages in an annular groove in a holding ring 54, 56, and in that both the annular band 50 and the annular bead 52 are each radially loaded by means of a wire ring 58, 60. The identical holding rings 54 and 56 are attached to the underside of the four-sided tube 12, for example with glue, and have an inner diameter that is sufficiently large that it surrounds the largest portion of the longitudinal opening 24 up to the end section filled by the cap 14 and approximately the inner half of the longitudinal opening 26, the outer half of which is filled by the projection 38 of the extension 40 of the cap 15. At both ends of the tube the holding ring 54, 56 overlaps the cap 14, 15, to which they are not attached but only abut.

A pair of strap-like first couplings 62 are hinged at one end to the plate-like extension 28 of the mounting support 16, while the other ends thereof are hinged to a stop 64, which is inserted in one end of the hollow first connecting rod 66, which is formed as a round tube, and is welded to this end of the rod.

Referring now to FIG. 3 in conjunction with FIG. 1b, the first connecting rod 66 is coaxially arranged in the transverse four-sided tube 12 and has a threaded end section 68 on the end opposite the stop, the free end of which to a degree overlaps the free end of the extension 40 of the cap 15 and which carries there a threaded sleeve 70 with a closure flange which is secured in place by a lock nut 72. A retaining nut 74 with a lock nut 76 is threaded onto the section of the sleeve 70 that projects axially outward beyond the threaded section 68, which secures in place a four-sided ring 78 abutting the flange of the sleeve 70 and also sets on the sleeve 70, whereby the flange, the nut 72 locking the flange and the two cooperating nuts 74, 76 have an outside diameter corresponding to the outside edge length of the four-sided ring 78, which is somewhat smaller than the vertical opening in the four-sided tube 12. To assure that the four-sided ring 78 cannot rotate about the longitudinal axis of the first connecting rod 66 on the cylindrical sleeve 70, the center section thereof has an external square cross-section between its flange and the lock nut 74. A circular cross-section and a corresponding inside shape of the externally four-sided ring 78, however, would also be possible.

At the sides, the four-sided ring 78 carries the two circular stubs 80 and 82 of a horizontal hinge axle that is interrupted by this ring and mathematically bisects the first connecting rod 66, and with its two stubs hinges at one end a pair of strap-like second couplings 84, the other ends of which are hinged to the extension 30 of the mounting support 18, whereby these second couplings and the first couplings 62 are always arranged parallel to each other, so that when the mounting support 16 is arranged vertically, a pivoting of the cross-member four-sided tube 12 about the horizontal pivot axle 42 of this support always causes the longitudinal axle of the other mounting support 18 to remain vertical, independent of its movement through an arc around the longitudinal axis of the mounting support 16.

Figure 8:
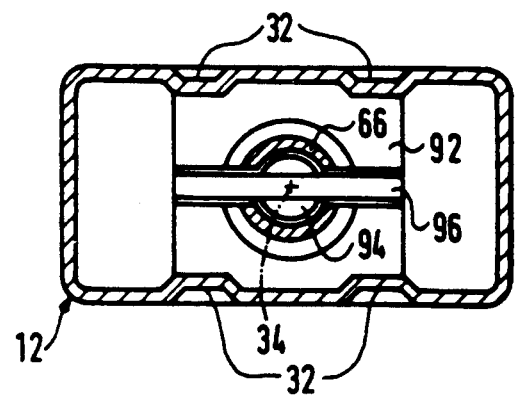
FIGS. 8 through 10 are respective vertical cross-sections according to the line VIII—VIII in FIG. 1a or IX—IX or X—X in FIG. 1b through the exemplary embodiment in the opposite of the horizontal directions.
Figure 10:
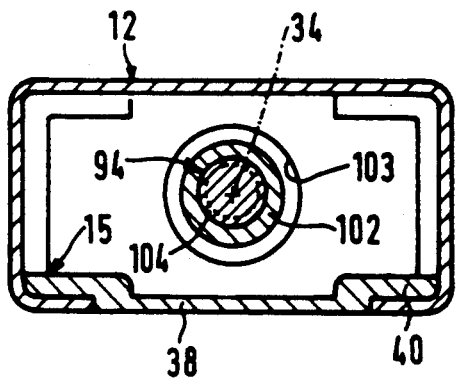

For weight compensation of the medical apparatus intended to be clamped to the mounting support 18, a helical compression spring 86 is provided which sits on the first connecting rod 66 and fits into the four-sided tube 12 that serves as the spring housing. One end of the spring 86 is more or less supported on the annular element 88 that is screwed onto the threaded end section 68 of the first connecting rod 66, and is thus stationary relative to the rod. The annular element 88 has a slide ring 90 that touches the inside of the spring housing 12 at two diametrically opposite points and, together with the two second couplings 84, provides the radial placement of the first connecting rod 66 in two perpendicular directions in conjunction with a tensioning element 92 (see FIG. 1a) that is fixed relative to the housing. The other end of the helical compression spring 86 is supported on this tensioning element 92. The top and bottom of this tensioning element 92 are therefore guided on the spring housing 12 and it sits on the end of the first connection rod 66 nearest the stop so as to slide thereon. The tensioning element 92, like the axially adjustable annular element 88, belongs to a device to prebias the spring 86 by means of a second connecting rod 94 mounted in the first connecting rod 66 and slidably guided thereby in the direction of the longitudinal axis 34. The second connecting rod 94 is formed as a solid bar, and at its end near the stop it is provided with a tie bolt 96 which engages in the tensioning element 92 through two parallel slots 98 (see FIGS. 1b and 8) in the wall of the end of the first connecting rod 66 nearest the stop and can thus move together with the second connecting rod 94 when it is moved. A rotatable adjusting screw element 100, which has a flange abutting the smooth frontal side of the cap 15 and has a sleeve 102 (see FIGS. 1b and 10) with an internal threading, assures that the tie bolt 96 and second connecting rod 94 move together. The adjusting screw element 100 is screwed to the second connecting rod 94 through a central bore 103 in the cap 15. In the drawings the spring 86 is shown with the smallest prebiasing, (aside from the fact that the annular element 88 could be screwed back to the support extension 30, whereby the tensioning element 92 abuts the bead 32 which serves as a stop and the sleeve 102 engages slightly into the sleeve 70 guiding it, when the parallel mounting supports 16 and 18 are arranged as shown at right angles to the four-sided tube 12. In this condition of the pivot arm it should exactly support the apparatus located on the mounting supports 18 without self-induced movement when the sleeve 102 is screwed to the center of the element of the threaded section 104 lying inside the sleeve 70, whereby the tensioning element 92 then no longer abuts the bead 32. In addition to this fine adjustment by means of the adjusting screw element 100, a presetting is possible by means of the annular element 88, which can no longer be changed after the final mounting of the pivot arm. The helical compression spring 86 is selected according to the average weight of the apparatus to be attached.

Figure 6:
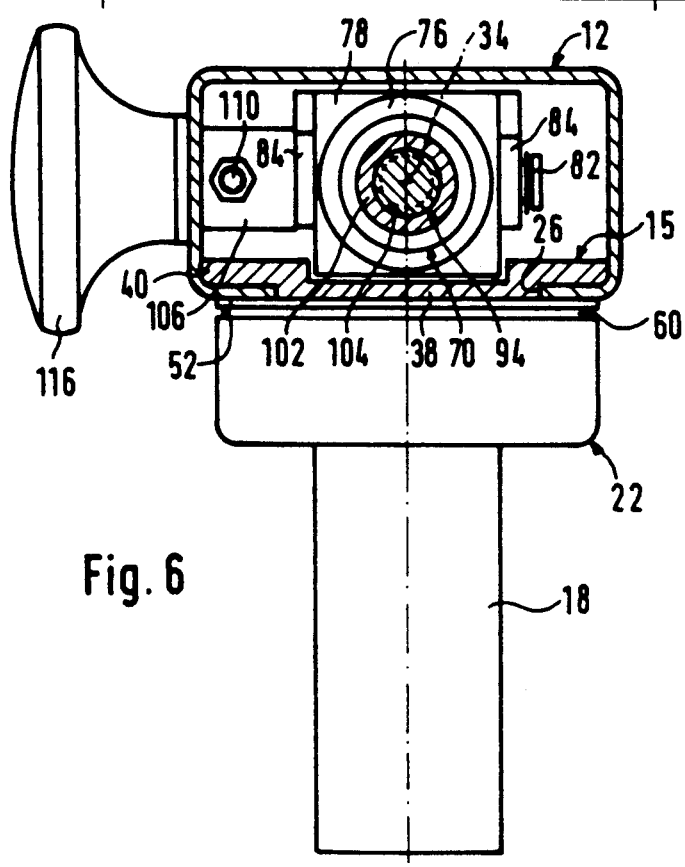
FIGS. 6 and 7 are respective vertical cross-sections according to the line VI—VI or VII—VII in FIG. 1b through the exemplary embodiment in one of these horizontal directions.
Figure 7:
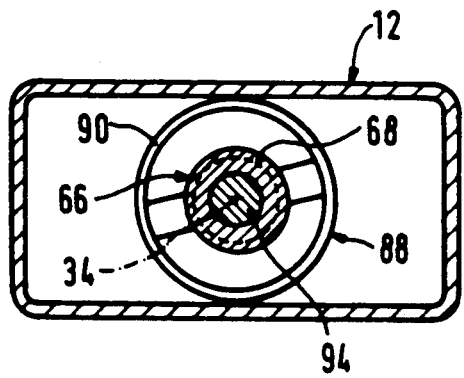
Figure 9:
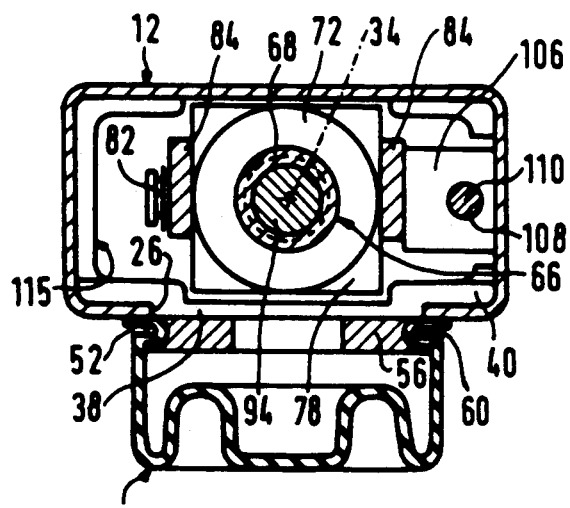

A braking or arresting device (whether braking or arresting is appropriate depends on the force required) makes it possible to more or less exactly compensate for the weight of the attached apparatus only in a certain relative pivot position of the mounting supports 16 and 18 relative to the transverse four-sided tube 12, without activating the spring prebiasing device; this device has a cube 106 (see FIGS. 3, 6, and 9) that is smoothly guided on one side wall of the tube 12, sits on the free end of the axle stubs 80 and has a bore 108 lying parallel to the longitudinal axis 34, and a cylindrical bar 110 is mounted therein so as to not be capable of longitudinal movement. This bar 110 slidingly engages in a through-bore in an apparatus element 112 that is securely set in the wall of the four-sided tube 12 from the inside and is provided with an outwardly projecting threaded bar 114. The apparatus element 112 is mounted such that it can slide somewhat relative to the tube 12 along its axis. A graspable rotary knob 116 that is similar to a hand wheel is mounted on the threaded bar 114 outside of the four-sided tube 12, which knob 116 is mounted on the tube 12 so as to be rotatable but axially immovable. The tube 12, together with the internal bar 110, between them clamp an annular disc 118 that produces an adhesion friction, and the friction increases as the bar 110 is drawn more firmly against the wall of the spring housing 12 by a rotation of the knob 116. This annular disc 118 sits on the element 112 of the braking or arresting device.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A pivot arm, one end of which is to be mounted on a stationary support or other such carrier or attachment of an apparatus, particularly a medical apparatus to be pivoted up and down as well as in a plane, comprising:

first and second mounting supports that are always parallel to one another and are connected with each other by at least one cross-member that is hinged to both supports by means of parallel pivot axles;

said cross-member forming a spring housing in which a helical compression spring is indirectly supported against the spring housing and a connecting rod that holds a spring support which is fixed relative to the rod adjacent said second mounting support, said spring and connecting rod being coaxially arranged within said spring housing, wherein;

said connecting rod is hinged to said first mounting support by means of at least a first coupling wherein:

said cross-member forming said spring housing comprises a single, hollow, primarily tubular member that is essentially closed on all sides and housing a second coupling between the rod end nearest the spring support and the adjacent second mounting support, whereby both couplings are always arranged parallel to each other within said spring housing; and said tubular member includes an opening for each mounting support, each opening being located along one of said sides and directed transverse to said connecting rod, said tubular member being closed at opposite ends thereof.

2. The pivot arm according to claim 1, wherein said cross-member forming said spring housing has a rectangular annular cross-section having four right angles and has at its two ends said openings that are open near the end, for the passage therethrough of said mounting supports, respectively, and wherein the two pivot axles for the two mounting supports are mounted outside of the cross-member by means of respective flat elements provided on said cross-member and flanking said openings.

3. The pivot arm according to claim 1, wherein the opposite ends of the tubular member being closed by means of respective insertable caps.

4. The pivot arm according to claim 1, wherein said cross-member forming said spring housing includes said openings that are open near the housing end, for the passage therethrough of said mounting supports, respectively, and wherein the two pivot axles for the two mounting supports are mounted outside of the cross-member by means of respective flat elements provided on said cross-member and flanking the openings.

5. The pivot arm according to claim 1, wherein the two pivot axles for the two mounting supports are mounted outside of the cross-member by means of the openings in cooperation with respective flanking flat elements provided on said mounting supports, and wherein further the two openings for the two mounting support are closed sufficiently to exclude liquids by means of respective clamped folding bellows that do not engage behind the walls of said housing.

6. The pivot arm according to claim 5, wherein each of the folding bellows encompasses two of the flat elements and one end of each of said bellows is located on the underside of the housing on a holder ring that surrounds the associated longitudinal recess of the housing, while the other end of each of said bellows is form-fittingly and/or force-fittingly located on the associated mounting support.

7. A pivot arm, one end of which is to be mounted on a stationary support or other such carrier or attachment of an apparatus, particularly a medical apparatus to be pivoted up and down as well as in a plane, comprising:

first and second mounting supports that are always parallel to one another and are connected with each other by at least one cross-member that is hinged to both supports by means of parallel pivot axles;

said cross-member forming a spring housing in which a helical compression spring is indirectly supported against the spring housing and a connecting rod that holds a spring support which is fixed relative to the rod adjacent said second mounting support, said spring and connecting rod being coaxially arranged within said spring housing, wherein;

said connecting rod is hinged to said first mounting support by means of at least a first coupling wherein;

said cross-member forming said spring housing comprises a single, hollow, primarily tubular member that is essentially closed on all sides and houses a second coupling between the rod end nearest the spring support and the adjacent second mounting support whereby both couplings are always arranged parallel; to each other within said spring housing; and a device for adjusting the prebiasing of the spring supported on a tensioning element that is relatively stationary to the housing, wherein the tensioning element is mounted in the spring housing so as to be able to move back and forth in the direction along the longitudinal axis of said housing and can be moved relative to the housing by means of a second connecting rod disposed within a hollow interior of the first connection rod, said connecting rod supporting a tie bolt on its axially inner end for effectuating said movement, said tie bolt cooperating with slots formed in the wall of the radially outside connecting rod to act on the tensioning element, said connecting rod further having a threaded section on its axially outer end that is provided with a rotatably arranged, axially adjustable adjusting screw element disposed outside of the spring housing.

8. The pivot arm according to claim 7, wherein said cross-member forming said spring housing has a rectangular annular cross-section having four right angles and has at its two ends respective longitudinal recesses that are open toward the end, for the passage therethrough of said mounting supports, respectively, and wherein the two pivot axles for the two mounting supports are mounted outside of the cross-member by means of the longitudinal recesses in cooperation with respective flanking flat elements provided on said mounting supports.

9. The pivot arm according to claim 7, wherein the ends of the spring housing are closed by means of respective insertable caps.

10. The pivot arm according to claim 7, wherein said cross-member has at its two ends respective longitudinal recesses that are open toward the end, for passage therethrough of said mounting supports, respectively, and wherein the two pivot axles for the two mounting supports ar mounted outside of the cross-member by mans of the longitudinal recesses in cooperation with respective flanking flat elements provided on said mounting supports, and wherein further the two longitudinal recesses for the two mounting supports are closed sufficiently to exclude liquids by means of respective clamped folding bellows that do not engage behind the walls of said housing.

11. The pivot arm according to claim 10, wherein each of the following bellows encompasses two of the flat elements and one end of each of said bellows is located on the underside of the housing on a holder ring that surrounds the associated longitudinal recess of the housing, while the other end of each of said bellows is form-fittingly and/or force-fittingly located on the associated mounting support.

12. A pivot arm, one end of which is to be mounted on a stationary support or other such carrier or attachment of an apparatus, particularly a medical apparatus to be pivoted up and down as well as in a plane, comprising:
   first and second mounting supports (16, 28 and 18, 30) that are always parallel to one another and are connected with each other by at least one cross-member (12) that is hinged to both supports (16 and 18) by means of parallel pivot axles (42 and 44);
   said cross-member (12) forming a spring housing in which a helical compression spring (86) is indirectly supported against the spring housing (12) and a connecting rod (66) that holds a spring support which is fixed relative to the rod adjacent said second mounting support, (18, 30) said spring support and connecting rod being coaxially arranged within said spring housing, wherein:
   said connecting rod (66) is hinged to said first mounting support (16, 28) by means of at least a first coupling (62) wherein:
   said cross-member forming said spring housing comprises a single, hollow, primarily tubular member that is essentially closed on all sides and houses a second coupling (84) between the rod end (68) nearest the spring support and the adjacent second mounting support (18, 30), whereby both couplings (62 and 84) are always arranged parallel to each other within said spring housing (12); and
   a device for braking or arresting the cross-member (12), said device comprising a bar (110) that is hingedly connected with said second mounting support (18) and an apparatus element (112) with a through-bore that guides the bar (110) in its longitudinal direction, which apparatus element (112) is attached to a threaded rod (114) that is axially movable and non-rotatably mounted on the cross-member, which threaded rod (114) is screwed to an axially immovable rotary knob (116) with internal threading rotatably mounted on each cross-member (12), wherein the bar (110) is attached to a hinge axle (80 and 82) to connect said second coupling (84) with the hollow first connecting rod (66).

13. The pivot arm according to claim 12, having a device for adjusting the prebiasing of the spring (86) supported on a tensioning element (92) that is relatively stationary to the housing, wherein the tensioning element (92) is mounted in the spring housing (12) so as to be able to move back and forth in the direction along the longitudinal axis (34) of said housing and can be moved relative to the housing by means of a second connecting rod (94) disposed within a hollow interior of the first connecting rod (66), said connecting rod (94) supporting a tie bolt (96) on its axially inner end for effectuating said movement, said tie bolt (96) cooperating with slots (98) formed in the wall of the radially outside connecting rod (66) to act on the tensioning element (92), said connecting rod further having a threaded section (104) on its axially outer end that is provided with a rotatably arranged, axially adjustable adjusting screw element (100) disposed outside of spring housing (12).

14. THe pivot arm according to claim 13, wherein said cross-member (12) forming said spring housing (12) has a rectangular annular cross-section having four right angles and has at its two ends respective longitudinal recesses (24, 26) that are open toward the end, for the passage therethrough of said mounting supports (16, 18), respectively, and wherein the two pivot axles (42 and 44) for the two mounting supports (16, 18) are mounted outside of the cross-member (12) by means of the longitudinal recesses (24 and 26) in cooperation with respective flanking flat elements (46 and 48) provided on said mounting supports (16, 18).

15. The pivot arm according to claim 12, wherein said cross-member (12) forming said spring housing (12) has a rectangular annular cross-section having four right angles and has at its two ends respective longitudinal recesses (24, 26) that are open toward the end, for the passage therethrough of said mounting supports (16, 18), respectively, and wherein the two pivot axles (42 and 44) for the two mounting supports (16, 18) are mounted outside of the cross-member (12) by means of the longitudinal recesses (24 and 26) in cooperation with respective flanking flat elements (46 and 48) provided on said mounting supports (16, 18).

16. The pivot arm according to claim 12, wherein the two ends of the spring housing (12) are closed by means of respective insertable caps (14 or 15).

17. The pivot arm according to claim 16, wherein said cross-member (12) forming said spring housing (12) has a rectangular annular cross-section having four right angles and has at its two ends respective longitudinal recesses (24, 26) that are open toward the end, for the passage therethrough of said mounting supports (16, 18), respectively, and wherein the two pivot axles (42 and 44) for the two mounting supports (16, 18) are mounted outside of the cross-member (12) by means of the longitudinal recesses (24 and 26) in cooperation with respective flanking flat elements (46 and 48) provided on said mounting supports (16, 18).

18. The pivot arm according to claim 16, having a device for adjusting the prebiasing of the spring (86) supported on a tensioning element (92) that is relatively stationary to the housing, wherein the tensioning element (92) is mounted in the spring housing (12) so as to be able to move back and forth in the direction along the longitudinal axis (34) of said housing and can be moved relative to the housing by means of a second connecting rod (94) disposed within a hollow interior of the first connecting rod (66), said connecting rod (94) supporting a tie bolt (96) on its axially inner end for effectuating said movement, said tie bolt (96) cooperating with slots (98) formed in the wall of the radially outside connecting rod (66) to act on the tensioning element (92), said connecting rod further having a threaded section (104) on its axially outer end that is provided with a rotatably arranged, axially adjustable adjusting screw element (100) disposed outside of spring housing (12).

19. The pivot arm according to claim 16, wherein said cross-member (12) forming said spring housing (12) has a rectangular annular cross-section having four right angles and has at its two ends respective longitudinal recesses (24, 26) that are open toward the end, for the passage therethrough of said mounting supports (16, 18), respectively, and wherein the two pivot axles (42 and 44) for the two mounting supports (16, 18) are mounted outside of the cross-member (12) by means of the longitudinal recesses (24 and 26) in cooperation with respective flanking flat elements (46 and 48) provided on said mounting supports (16, 18).

20. The pivot arm according to claim 19, wherein the two longitudinal recesses (24 and 26) of the two mounting supports (16 and 18) are closed sufficiently to exclude liquids by means of respective clamped folding bellows (20 and 22) that do not engage behind the walls of said housing (12).

21. The pivot arm according to claim 20, wherein each of the folding bellows (20, 22) encompasses two of the flat elements (46, 48) and one end of each of said bellows is located on the underside of the housing on a holder ring (54, 56) that surrounds the associated longitudinal recess (24, 26) of the housing (12), while the other end of each of said bellows is form-fittingly and-/or force fittingly located on the associated mounting support (16, 18).

* * * * *

UNITED STATES PATENT AND TRADEMARK OFFICE
CERTIFICATE OF CORRECTION

PATENT NO. : 5,004,368
DATED : April 2, 1991
INVENTOR(S) : Ewald WARGA It is certified that error appears in the above-identified patent and that said Letters Patent is hereby corrected as shown below:

Column 2, line 26, "racially" should be --radially--.

<u>IN THE CLAIMS</u>:

Claim 7, column 8, line 35, "parallel; to" should be --parallel to--.

Claim 10, column 9, line 6, "ar" should be --are--;
line 7, "mans" should be --means--.

Claim 14, column 10, line 16, "THe" should be --The--.

Claim 19, column 11, line 6, "according to claim 16" should be --according to claim 18--.

Signed and Sealed this

Fifteenth Day of September, 1992

Attest:

DOUGLAS B. COMER

Attesting Officer

Acting Commissioner of Patents and Trademarks